(12) United States Patent
Okamoto

(10) Patent No.: US 11,293,893 B2
(45) Date of Patent: Apr. 5, 2022

(54) GAS SENSOR AND GAS CONCENTRATION MEASUREMENT METHOD

(71) Applicant: NGK INSULATORS, LTD., Aichi (JP)

(72) Inventor: Taku Okamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 369 days.

(21) Appl. No.: 16/438,533

(22) Filed: Jun. 12, 2019

(65) Prior Publication Data

US 2019/0383765 A1    Dec. 19, 2019

(30) Foreign Application Priority Data

Jun. 15, 2018   (JP) .............................. JP2018-114325

(51) Int. Cl.
| | |
|---|---|
| *G01N 27/409* | (2006.01) |
| *G01N 27/41* | (2006.01) |
| *G01N 27/416* | (2006.01) |
| *G01N 27/407* | (2006.01) |

(52) U.S. Cl.
CPC ....... *G01N 27/409* (2013.01); *G01N 27/4074* (2013.01); *G01N 27/4076* (2013.01); *G01N 27/41* (2013.01); *G01N 27/416* (2013.01)

(58) Field of Classification Search
None
See application file for complete search history.

(56) References Cited

U.S. PATENT DOCUMENTS

2017/0102354 A1\*   4/2017   Aoki ................... G01N 27/417
2019/0128833 A1   5/2019   Nakagaki

FOREIGN PATENT DOCUMENTS

WO     2017/222002 A1   12/2017

\* cited by examiner

*Primary Examiner* — J. Christopher Ball
(74) *Attorney, Agent, or Firm* — Mattingly & Malur, PC

(57) ABSTRACT

In a gas sensor configured to measure the concentrations of a plurality of components in the presence of oxygen, in the interior of a structural body made from an oxygen ion conductive solid electrolyte, a preliminary chamber having a mixed potential electrode, an oxygen concentration adjustment chamber having a main pump electrode, and a measurement chamber having a measurement electrode are formed in a manner communicating in this order. While oxygen within the gas to be measured is being discharged by the main pump electrode and the measurement electrode, the $NH_3$ concentration within the gas to be measured is measured by a mixed potential V0 of the mixed potential electrode.

10 Claims, 7 Drawing Sheets

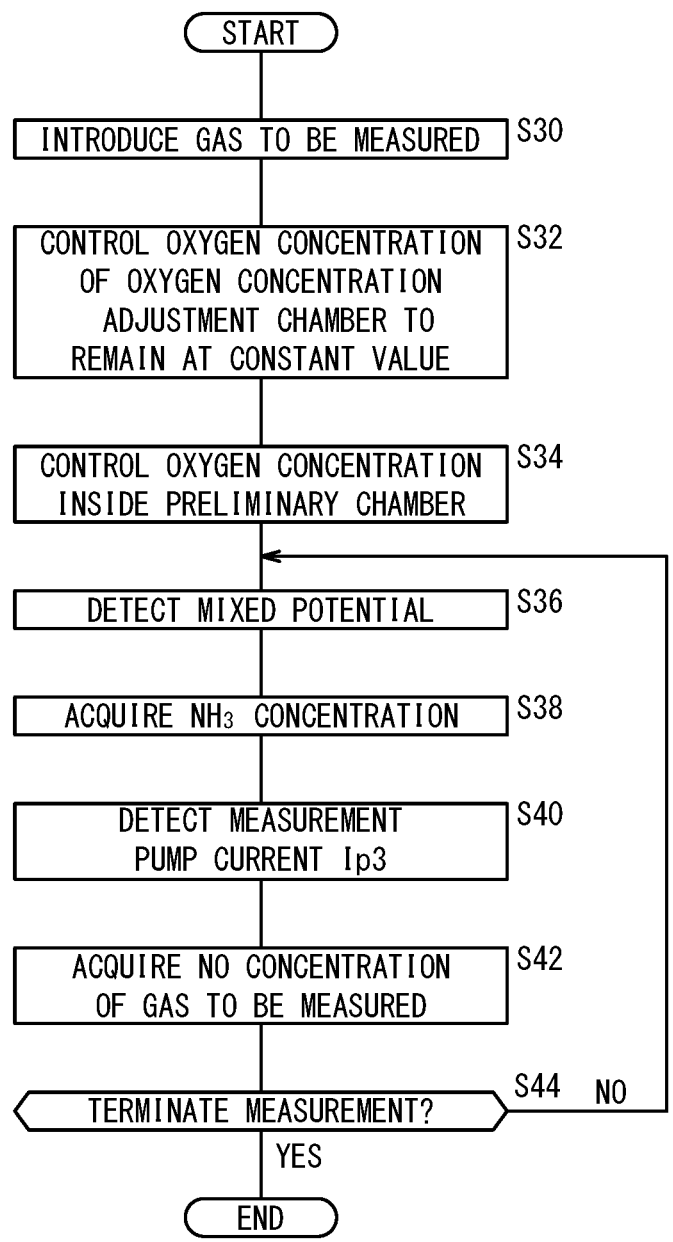

GAS SENSOR AND GAS CONCENTRATION MEASUREMENT METHOD

CROSS-REFERENCE TO RELATED APPLICATION

This application is based upon and claims the benefit of priority from Japanese Patent Application No. 2018-114325 filed on Jun. 15, 2018, the contents of which are incorporated herein by reference.

BACKGROUND OF THE INVENTION

Field of the Invention

The present invention relates to a gas sensor and a gas concentration measurement method.

Description of the Related Art

Conventionally, gas sensors have been proposed which measure concentrations of a plurality of target components such as nitrogen oxide (NO) and ammonia ($NH_3$) and the like that coexist in the presence of oxygen, such as in an exhaust gas.

For example, in International Publication No. WO 2017/222002, a gas sensor is disclosed, in which, in an oxygen ion conductive solid electrolyte, a preliminary chamber, a main chamber, an auxiliary chamber, and a measurement chamber which are partitioned by diffusion resistance members are provided, together with pumping electrodes being disposed in each of the chambers. With such a gas sensor, switching between progression and stoppage of an oxidation reaction of $NH_3$ into NO taking place inside the preliminary chamber is performed by switching between driving and stopping of the pumping electrodes of the preliminary chamber. In addition, the gas concentrations of $NH_3$ and NO are measured on the basis of a change in the pumping current of a measurement electrode, which occurs due to a difference in the diffusion rate of $NH_3$ and NO from the preliminary chamber into the main chamber.

SUMMARY OF THE INVENTION

However, in the gas sensor described in International Publication No. WO 2017/222002, it is necessary to perform measurements while switching between driving and stopping of the pumping electrode at regular time intervals. The time period for driving or stopping the pumping electrode when the measurements are performed is required to be sufficiently longer than the time period until the concentrations of the gases inside the preliminary chamber, the main chamber, the auxiliary chamber, and the measurement chamber become constant, and a predetermined amount of time is required until the measurement results of the gas concentrations of $NH_3$ and NO are obtained. Therefore, there is a problem in that the response speed of the sensor output with respect to changes in the gas concentrations is low.

The present invention has the object of providing a gas sensor and a gas concentration measurement method, which are superior in terms of the response speed of the sensor output with respect to changes in gas concentrations.

One aspect of the present invention is characterized by a gas sensor configured to measure concentrations of a plurality of components in the presence of oxygen, including a structural body made up from a solid electrolyte that exhibits at least oxygen ion conductivity, a gas introduction port formed in the structural body and into which a gas to be measured is introduced, a preliminary chamber including a mixed potential electrode and communicating with the gas introduction port, an oxygen concentration adjustment chamber including a main pump electrode and communicating with the preliminary chamber, a measurement chamber including a measurement electrode and communicating with the oxygen concentration adjustment chamber, a reference electrode formed on a surface of the structural body and placed in contact with a reference gas, a main oxygen concentration control unit configured to control the oxygen concentration inside the oxygen concentration adjustment chamber based on a voltage of the main pump electrode, an $NH_3$ concentration measurement unit configured to detect a mixed potential between the reference electrode and the mixed potential electrode, an NO concentration measurement unit configured to measure the NO concentration inside the measurement chamber based on a pump current of the measurement electrode, and a target component acquisition unit configured to acquire the $NH_3$ concentration and the NO concentration within the gas to be measured.

Further, another aspect of the present invention is characterized by a gas concentration measurement method by which concentrations of a plurality of components within a gas to be measured are measured in the presence of oxygen, using a gas sensor equipped with a structural body made up from a solid electrolyte that exhibits at least oxygen ion conductivity, a gas introduction port formed in the structural body and into which the gas to be measured is introduced, a preliminary chamber including a mixed potential electrode and communicating with the gas introduction port, an oxygen concentration adjustment chamber including a main pump electrode and communicating with the preliminary chamber, a measurement chamber including a measurement electrode and communicating with the oxygen concentration adjustment chamber, and a reference electrode formed on a surface of the structural body and placed in contact with a reference gas, the method including a step of acquiring an $NH_3$ concentration within the gas to be measured, by detecting a mixed potential of the mixed potential electrode, while a pump current is supplied to the measurement electrode and the oxygen within the gas to be measured is being discharged.

In accordance with the gas sensor and the gas concentration measurement method of the aforementioned aspects, the $NH_3$ concentration and the NO concentration can be measured without switching between driving and stopping of the preliminary pump electrode in the preliminary chamber, and therefore, the gas sensor and the gas concentration measurement method are superior in terms of response speed.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is a flowchart showing a gas concentration measurement method according to the second embodiment.

DESCRIPTION OF THE PREFERRED EMBODIMENTS

Embodiments of a gas sensor and a gas concentration measurement method according to the present invention will be presented and described below with reference to FIGS. 1 to 7. In the present specification, the term "to" when used to indicate a numerical range is used with the implication of including the numerical values written before or after the term as a lower limit value or an upper limit value of the numerical range.

First Embodiment

Figure 1:
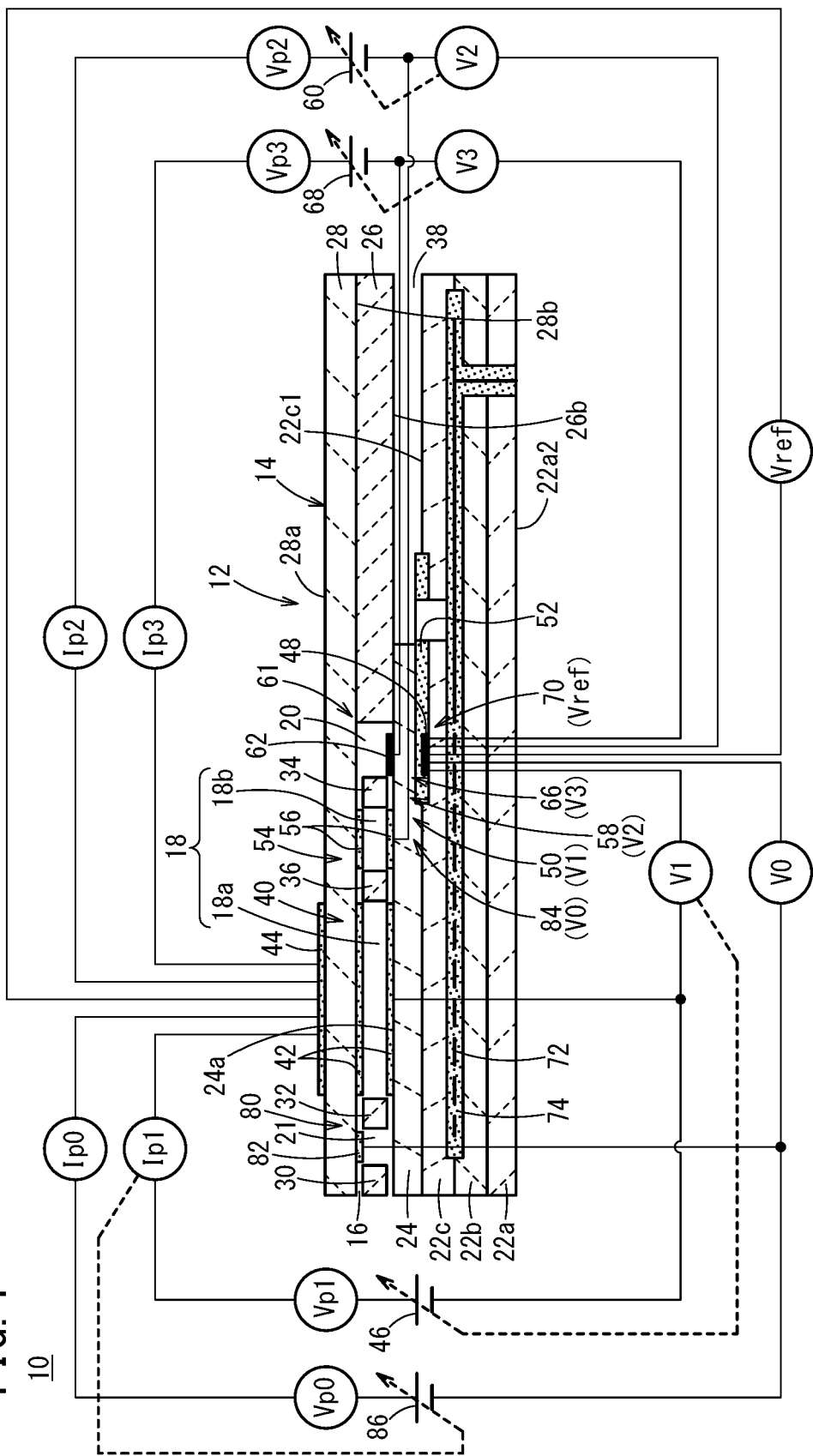
FIG. 1 is a cross-sectional view in which there is shown one structural example of a gas sensor according to an embodiment of the present invention.
Figure 2:
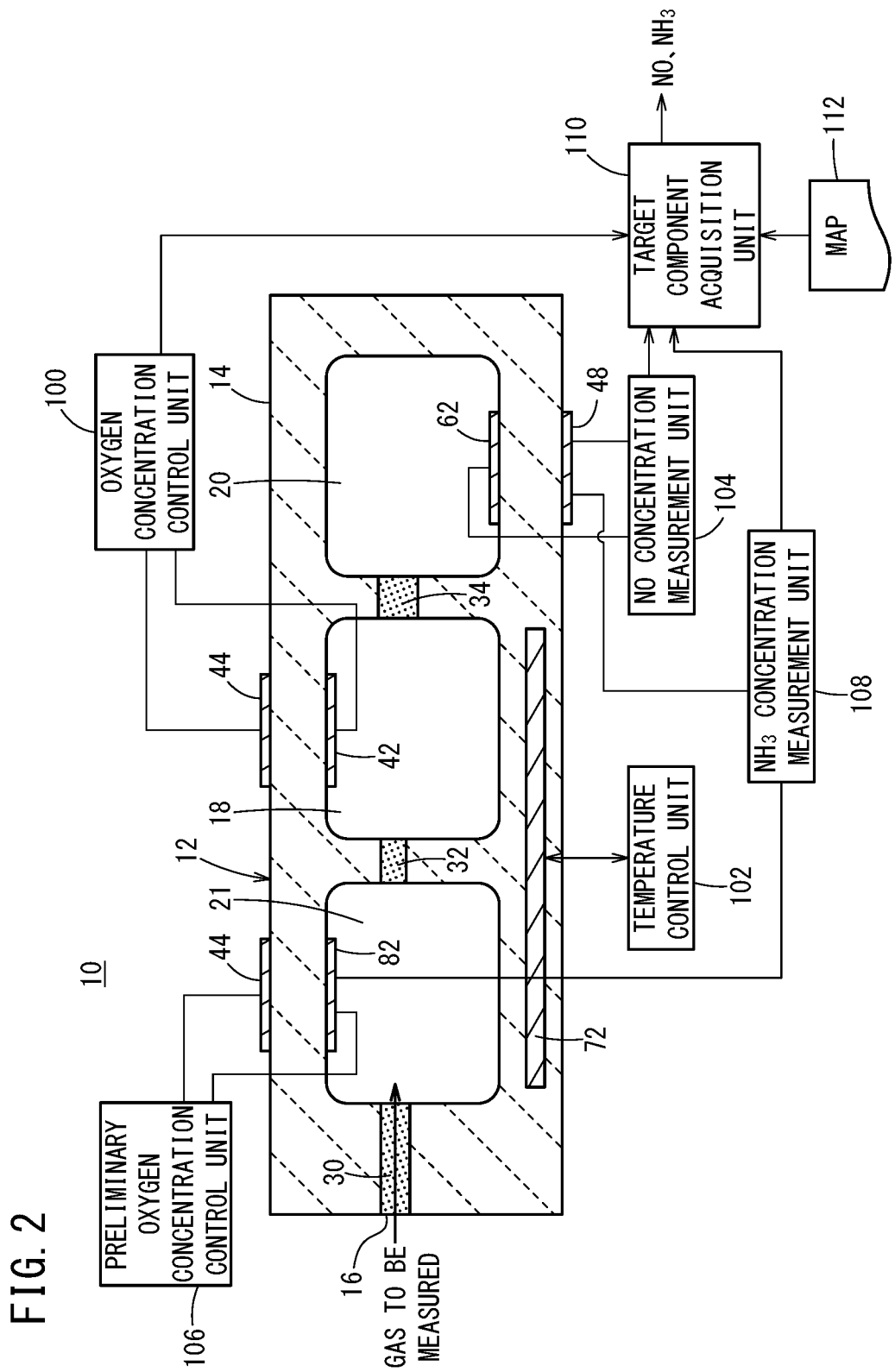
FIG. 2 is a block diagram of the gas sensor shown in FIG. 1.

As shown in FIGS. 1 and 2, a gas sensor 10 according to a first embodiment includes a sensor element 12. The sensor element 12 is equipped with a structural body 14 made up from an oxygen ion conductive solid electrolyte. In the interior of the structural body 14, there are formed a gas introduction port 16 into which a gas to be measured is introduced, an oxygen concentration adjustment chamber 18 communicating with the gas introduction port 16, and a measurement chamber 20 communicating with the oxygen concentration adjustment chamber 18.

The oxygen concentration adjustment chamber 18 includes a main chamber 18a communicating with the gas introduction port 16, and an auxiliary chamber 18b communicating with the main chamber 18a. The measurement chamber 20 communicates with the auxiliary chamber 18b.

Furthermore, the gas sensor 10 includes a preliminary chamber 21 provided between the gas introduction port 16 and the main chamber 18a within the structural body 14, and which communicates with the gas introduction port 16.

More specifically, the structural body 14 of the sensor element 12 is constituted by six layers including a first substrate layer 22a, a second substrate layer 22b, a third substrate layer 22c, a first solid electrolyte layer 24, a spacer layer 26, and a second solid electrolyte layer 28, which are stacked in this order from a lower side as viewed in the drawing. The layers are each composed of an oxygen ion conductive solid electrolyte layer such as zirconia ($ZrO_2$) or the like.

Between a lower surface 28b of the second solid electrolyte layer 28 and an upper surface 24a of the first solid electrolyte layer 24 on a distal end side of the sensor element 12, there are provided the gas introduction port 16, a first diffusion rate control member 30, the preliminary chamber 21, a second diffusion rate control member 32, the oxygen concentration adjustment chamber 18, a third diffusion rate control member 34, and the measurement chamber 20. Further, a fourth diffusion rate control member 36 is provided between the main chamber 18a and the auxiliary chamber 18b that make up the oxygen concentration adjustment chamber 18.

The gas introduction port 16, the first diffusion rate control member 30, the preliminary chamber 21, the second diffusion rate control member 32, the main chamber 18a, the fourth diffusion rate control member 36, the auxiliary chamber 18b, the third diffusion rate control member 34, and the measurement chamber 20 are formed adjacent to each other in a condition of communicating in this order. The portion from the gas introduction port 16 leading to the measurement chamber 20 is also referred to as a gas flow section.

The gas introduction port 16, the preliminary chamber 21, the main chamber 18a, the auxiliary chamber 18b, and the measurement chamber 20 are internal spaces provided in a condition of penetrating through the spacer layer 26 in the thickness direction. Upper portions of the preliminary chamber 21, the main chamber 18a, the auxiliary chamber 18b, and the measurement chamber 20 are defined by the lower surface 28b of the second solid electrolyte layer 28, and lower portions thereof are defined by the upper surface 24a of the first solid electrolyte layer 24. Further, side portions of the preliminary chamber 21, the main chamber 18a, the auxiliary chamber 18b, and the measurement chamber 20 are defined by side surfaces of the spacer layer 26.

Any of the first diffusion rate control member 30, the third diffusion rate control member 34, and the fourth diffusion rate control member 36 is provided as two horizontally elongated slits (in which openings thereof have a longitudinal direction in a direction perpendicular to the sheet surface of the drawing). The second diffusion rate control member 32 is provided as one horizontally elongated slit (in which an opening thereof has a longitudinal dimension in a direction perpendicular to the sheet surface of the drawing).

Further, a reference gas introduction space 38 is disposed between an upper surface 22c1 of the third substrate layer 22c and a lower surface 26b of the spacer layer 26, at a position that is farther from the distal end side than the gas flow section. The reference gas introduction space 38 is an internal space in which an upper part thereof is defined by the lower surface 26b of the spacer layer 26, a lower part thereof is defined by the upper surface 22c1 of the third substrate layer 22c, and a side part thereof is defined by a side surface of the first solid electrolyte layer 24. For example, oxygen or atmospheric air is introduced as a reference gas into the reference gas introduction space 38.

The gas introduction port 16 is a portion that opens with respect to the external space, and the target gas to be measured is drawn into the sensor element 12 from the external space through the gas introduction port 16.

The first diffusion rate control member 30 is a location that imparts a predetermined diffusion resistance to the gas to be measured which is introduced from the gas introduction port 16 into the preliminary chamber 21.

The preliminary chamber 21 functions as a space for measuring the $NH_3$ concentration in the gas to be measured that is introduced from the gas introduction port 16. Further, as necessary, the preliminary chamber 21 also functions as a space for adjusting the oxygen partial pressure within the gas to be measured. In the interior of the preliminary chamber 21, a mixed potential electrode 82 is provided which generates a mixed potential in accordance with the $NH_3$ concentration.

In the mixed potential electrode 82, at a three-phase interface between the mixed potential electrode 82, the gas to be measured inside the preliminary chamber 21, and the solid electrolyte, an oxidation-reduction reaction occurs between the $O_2$ within the gas to be measured and the NO or $NH_3$, etc., existing within the gas to be measured. As a result, a potential difference (mixed potential) V0 corresponding to the concentration of NO or $NH_3$ is generated between the mixed potential electrode 82 and a later-described reference electrode 48.

As the material of the mixed potential electrode 82, a material is preferably used having a low catalytic activity with respect to the reaction between $NH_3$ and $O_2$, and which enables diffusion and spreading of the aforementioned gas components up to the three phase interface, without causing a combustion reaction between $NH_3$ and $O_2$ to occur on the electrode surface. Although no particular limitation is placed thereon, if there is used for the mixed potential electrode 82 a material which, among NO and $NH_3$, exhibits a large change in the mixed potential V0 with respect to a change in the concentration of $NH_3$, and a small change in the mixed potential V0 with respect to a change in the concentration of NO, the $NH_3$ concentration within the gas to be measured can be easily determined.

Specific examples of materials for the mixed potential electrode 82 include an Au (gold)-Pt (platinum) alloy, a Ni (nickel) alloy, a Co (cobalt) alloy, and the like. Further, for example, there can be used oxides containing any one or a plurality of V (vanadium), W (tungsten), and Mo (molybdenum), and composite oxides obtained by adding to the above oxides an additive for enhancing the detection selectivity with respect to $NH_3$. As specific examples for such oxides, there can be used either one of bismuth vanadium oxide ($BiVO_4$) or copper vanadium oxide ($Cu_2(VO_3)_2$).

In the case of using an Au—Pt alloy for the mixed potential electrode 82, when such an alloy is used having a concentration (atomic percentage) of Au on the surface of the mixed potential electrode 82 which is greater than or equal to 30 at %, the mixed potential V0 suitably becomes large. Such a mixed potential electrode 82 made of an Au—Pt alloy can be manufactured, for example, by applying a paste of an Au—Pt alloy in the preliminary chamber 21, and thereafter laminating a solid electrolyte that constitutes the structural body 14, and firing the applied paste together with the solid electrolyte. At this time, when the preparatory composition amount of Au contained in the Au—Pt alloy is 1 to 10%, the aforementioned Au concentration is suitably obtained in which the atomic percentage of Au, which is measured by XPS (X-ray photoelectron spectroscopy), is 30 at % on the surface of the mixed potential electrode 82.

A preliminary pump cell 80 is an electrochemical pump cell, which is constituted by the mixed potential electrode 82 provided substantially over the entirety of the lower surface 28b of the second solid electrolyte layer 28 facing toward the preliminary chamber 21, an exterior side pump electrode 44, and the second solid electrolyte layer 28.

The preliminary pump cell 80, by applying a desired preliminary pump voltage Vp0 between the mixed potential electrode 82 and the exterior side pump electrode 44, is capable of pumping out oxygen within the atmosphere inside the preliminary chamber 21 into the external space, or alternatively, is capable of pumping in oxygen from the external space into the preliminary chamber 21.

Moreover, measurement of the $NH_3$ concentration and the NO concentration in the first embodiment is performed without operating the preliminary pump cell 80. Accordingly, in the present embodiment, the preliminary pump cell 80 is a nonessential component. The preliminary pump cell 80 is operated in the measurement method of the second embodiment, to be described later.

The gas sensor 10 includes a mixed potential sensor cell 84 for detecting $NH_3$, in order to carry out detection of the $NH_3$ concentration within the atmosphere inside the preliminary chamber 21. The mixed potential sensor cell 84 includes the mixed potential electrode 82, the reference electrode 48, the second solid electrolyte layer 28, the spacer layer 26, and the first solid electrolyte layer 24. The mixed potential sensor cell 84 detects as the mixed potential V0 a potential difference between a potential generated by the reaction between $NH_3$ and oxygen within the atmosphere inside the preliminary chamber 21, and the potential of the reference electrode 48.

The preliminary chamber 21 also functions as a buffer space. More specifically, it is possible to cancel fluctuations in the concentration of the gas to be measured, which occur due to pressure fluctuations of the gas to be measured in the external space. As such pressure fluctuations of the gas to be measured, there may be cited, for example, pulsations or the like in the exhaust pressure of an automotive exhaust gas.

The second diffusion rate control member 32 is a location that imparts a predetermined diffusion resistance to the gas to be measured which is introduced from the preliminary chamber 21 into the main chamber 18a.

The main chamber 18a is provided as a space for the purpose of adjusting an oxygen partial pressure within the gas to be measured that is introduced from the gas introduction port 16. The oxygen partial pressure is adjusted by operation of a main pump cell 40.

The main pump cell 40 comprises an electrochemical pump cell, also referred to as a main electrochemical pumping cell, which is constituted by a main pump electrode 42, the exterior side pump electrode 44, and an oxygen ion conductive solid electrolyte which is sandwiched between the two pump electrodes. The main pump electrode 42 is formed substantially over the entire surfaces, respectively, of the upper surface 24a of the first solid electrolyte layer 24, the lower surface 28b of the second solid electrolyte layer 28, and the side surfaces of the spacer layer 26 that define the main chamber 18a. The exterior side pump electrode 44 is formed on the upper surface 28a of the second solid electrolyte layer 28. The position of the exterior side pump electrode 44 is preferably disposed in a region corresponding to the main pump electrode 42 in a condition of being exposed to an exterior side space. The main pump electrode 42 and the exterior side pump electrode 44 can be configured, for example, as rectangular porous cermet electrodes as viewed in plan.

The main pump electrode 42 is preferably made of a material having a weakened reduction capability with respect to the nitrogen oxide (NOx) component within the gas to be measured. Further, the main pump electrode 42 is preferably made of a material possessing an ability to oxidize the $NH_3$ within the gas to be measured. More specifically, for example, a cermet electrode of $ZrO_2$ and a noble metal such as Pt (platinum) containing 0.1 wt % to 1 wt % of Au (gold) can be used. It should be noted that, if the concentration of Au is higher than the aforementioned value, the ability of the main pump electrode 42 to cause oxidation with respect to $NH_3$ decreases, so that the reaction of converting $NH_3$ into NO in the main chamber 18a becomes unlikely to proceed.

The main pump cell 40 applies a first pump voltage Vp1 via a first variable power source 46 provided outside of the sensor element 12. As a result, by a first pump current Ip1 flowing between the exterior side pump electrode 44 and the main pump electrode 42, the $O_2$ inside the main chamber 18a can be pumped out, or alternatively, the $O_2$ in the external space can be pumped into the main chamber 18a.

Further, the sensor element 12 includes a first oxygen partial pressure detecting sensor cell 50 which is an electrochemical sensor cell. The first oxygen partial pressure detecting sensor cell 50 includes the main pump electrode 42, the reference electrode 48, and the oxygen ion conductive first solid electrolyte layer 24 sandwiched between these electrodes. The reference electrode 48 is an electrode formed between the first solid electrolyte layer 24 and the third substrate layer 22c, and is made of the same porous cermet as the exterior side pump electrode 44.

The reference electrode 48 is formed with a rectangular shape as viewed in plan. Further, around the periphery of the reference electrode 48, a reference gas introduction layer 52 is provided, which is made from porous alumina and is connected to the reference gas introduction space 38. The reference gas in the reference gas introduction space 38 is introduced to the surface of the reference electrode 48 via the reference gas introduction layer 52. The first oxygen partial pressure detecting sensor cell 50 generates a first electromotive force V1 between the main pump electrode 42 and the reference electrode 48, which is caused by the difference in oxygen concentration between the atmosphere inside the main chamber 18a and the reference gas in the reference gas introduction space 38.

The first electromotive force V1 generated in the first oxygen partial pressure detecting sensor cell 50 changes depending on the oxygen partial pressure of the atmosphere existing in the main chamber 18a. In accordance with the aforementioned first electromotive force V1, the sensor element 12 feedback-controls the first variable power source 46 of the main pump cell 40. Consequently, the first pump voltage Vp1, which is applied by the first variable power source 46, can be controlled in accordance with the oxygen partial pressure of the atmosphere in the main chamber 18a. Moreover, the first pump current Ip1 supplied to the main pump electrode 42 by the first variable power source 46 reflects the amount of $O_2$ that is pumped out from or pumped into the main chamber 18a. Accordingly, under a condition in which the first electromotive force V1 is being operated in a manner so as to remain constant, the first pump current Ip1 supplied to the main pump electrode 42 by the first variable power source 46 reflects the concentration of $O_2$ within the gas to be measured. Therefore, the concentration of oxygen within the gas to be measured can be obtained by detecting the first pump current Ip1. As will be described later, the oxygen concentration within the gas to be measured is used to correct an oxygen concentration dependency of the mixed potential.

The fourth diffusion rate control member 36 is a location that imparts a predetermined diffusion resistance to the gas to be measured, the oxygen concentration (oxygen partial pressure) of which is controlled by operation of the main pump cell 40 inside the main chamber 18a, and guides the gas to be measured into the auxiliary chamber 18b. The auxiliary chamber 18b is provided as a space for further carrying out adjustment of the oxygen partial pressure by an auxiliary pump cell 54, with respect to the gas to be measured which is introduced through the fourth diffusion rate control member 36, after the oxygen concentration (oxygen partial pressure) has been adjusted beforehand in the main chamber 18a. In accordance with this feature, the oxygen concentration inside the auxiliary chamber 18b can be kept constant highly accurately, and it is possible to measure the NOx concentration with high accuracy.

The auxiliary pump cell 54 is an electrochemical pump cell, and is constituted by an auxiliary pump electrode 56, which is provided substantially over the entirety of the lower surface 28b of the second solid electrolyte layer 28 facing toward the auxiliary chamber 18b, the exterior side pump electrode 44, and the second solid electrolyte layer 28.

Moreover, in the same manner as the main pump electrode 42, the auxiliary pump electrode 56 is also formed using a material that weakens the reduction capability with respect to the NOx component within the gas to be measured.

The auxiliary pump cell 54, by applying a desired second pump voltage Vp2 between the auxiliary pump electrode 56 and the exterior side pump electrode 44, is capable of pumping out oxygen within the atmosphere inside the auxiliary chamber 18b into the external space, or alternatively, is capable of pumping in oxygen from the external space into the auxiliary chamber 18b.

Further, in order to control the oxygen partial pressure within the atmosphere inside the auxiliary chamber 18b, an electrochemical sensor cell is constituted by the auxiliary pump electrode 56, the reference electrode 48, the second solid electrolyte layer 28, the spacer layer 26, and the first solid electrolyte layer 24. More specifically, a second oxygen partial pressure detecting sensor cell 58 is constituted thereby for controlling the auxiliary pump.

The second oxygen partial pressure detecting sensor cell 58 generates a second electromotive force V2 between the auxiliary pump electrode 56 and the reference electrode 48, which is caused by a difference in the oxygen concentration between the atmosphere inside the auxiliary chamber 18b and the reference gas in the reference gas introduction space 38. The second electromotive force V2 generated in the second oxygen partial pressure detecting sensor cell 58 changes depending on the oxygen partial pressure of the atmosphere existing in the auxiliary chamber 18b.

Based on the aforementioned second electromotive force V2, the sensor element 12 carries out pumping of the auxiliary pump cell 54 by controlling the second variable power source 60. Consequently, the oxygen partial pressure within the atmosphere inside the auxiliary chamber 18b is controlled so as to become a low partial pressure that does not substantially influence the measurement of NOx.

Further, a second pump current Ip2 of the auxiliary pump cell 54 is used so as to control the second electromotive force V2 of the second oxygen partial pressure detecting sensor cell 58. More specifically, the second pump current Ip2 is input as a control signal to the second oxygen partial pressure detecting sensor cell 58. As a result, the second electromotive force V2 is controlled, and the gradient of the oxygen partial pressure within the gas to be measured, which is introduced into the auxiliary chamber 18b through the fourth diffusion rate control member 36, is controlled to remain constant at all times. When the gas sensor 10 is used as a NOx sensor, by the actions of the main pump cell 40 and the auxiliary pump cell 54, the oxygen concentration inside the auxiliary chamber 18b is maintained at a predetermined value with high accuracy for each of the respective conditions.

The third diffusion rate control member 34 is a location that imparts a predetermined diffusion resistance to the gas to be measured, the oxygen concentration (oxygen partial pressure) of which is controlled by operation of the auxiliary pump cell 54 in the auxiliary chamber 18b and guides the gas to be measured into the measurement chamber 20.

Measurement of the NOx concentration is primarily performed by operation of a measurement pump cell 61 provided in the measurement chamber 20. The measurement pump cell 61 is an electrochemical pump cell constituted by a measurement electrode 62, the exterior side pump electrode 44, the second solid electrolyte layer 28, the spacer layer 26, and the first solid electrolyte layer 24. The measurement electrode 62 is provided, for example, on the upper surface 24a of the first solid electrolyte layer 24 inside the measurement chamber 20, and is constituted by a material whose reduction capability with respect to the NOx component within the gas to be measured is higher than that of the main pump electrode 42. The measurement electrode 62 can be, for example, a porous cermet electrode. Further, for the measurement electrode 62, a material preferably is used that also functions as a NOx reduction catalyst for reducing NOx that exists within the atmosphere.

The measurement pump cell 61 generates oxygen by decomposing nitrogen oxide around the periphery of the measurement electrode 62 inside the measurement chamber 20. Furthermore, the measurement pump cell 61 is capable of pumping out the oxygen generated at the measurement electrode 62, and detecting the generated amount of oxygen as a measurement pump current Ip3, or stated otherwise, as a sensor output.

Further, in order to detect the oxygen partial pressure around the periphery of the measurement electrode 62 inside the measurement chamber 20, an electrochemical sensor cell, and more specifically, a third oxygen partial pressure detecting sensor cell 66 for controlling the measurement pump, is constituted by the first solid electrolyte layer 24, the measurement electrode 62, and the reference electrode 48. A third variable power source 68 is controlled based on a third electromotive force V3 detected by the third oxygen partial pressure detecting sensor cell 66.

The gas to be measured, which is introduced into the auxiliary chamber 18b, reaches the measurement electrode 62 inside the measurement chamber 20 through the third diffusion rate control member 34, under a condition in which the oxygen partial pressure is controlled. NO existing within the gas to be measured around the periphery of the measurement electrode 62 is reduced to thereby generate oxygen. In this instance, the generated oxygen is subjected to pumping by the measurement pump cell 61. At this time, a third pump voltage Vp3 of the third variable power source 68 is controlled in a manner so that the third electromotive force V3 detected by the third oxygen partial pressure detecting sensor cell 66 becomes constant. The amount of oxygen generated around the periphery of the measurement electrode 62 is proportional to the concentration of NO within the gas to be measured. Accordingly, the NO concentration within the gas to be measured can be calculated using the measurement pump current Ip3 of the measurement pump cell 61. More specifically, the measurement pump cell 61 constitutes an NO concentration measurement unit 104 that measures the concentration of a specified component (NO) inside the measurement chamber 20.

Further, the gas sensor 10 includes an electrochemical sensor cell 70. The sensor cell 70 is constituted by the second solid electrolyte layer 28, the spacer layer 26, the first solid electrolyte layer 24, the third substrate layer 22c, the exterior side pump electrode 44, and the reference electrode 48. In accordance with the electromotive force Vref obtained by the sensor cell 70, it is possible to detect the oxygen partial pressure within the gas to be measured existing externally of the sensor.

Furthermore, in the sensor element 12, a heater 72 is formed in a manner of being sandwiched from above and below between the second substrate layer 22b and the third substrate layer 22c. The heater 72 generates heat by being supplied with power from the exterior through a non-illustrated heater electrode provided on a lower surface 22a2 of the first substrate layer 22a. As a result of the heat generated by the heater 72, the oxygen ion conductivity of the solid electrolyte that constitutes the sensor element 12 is enhanced. The heater 72 is embedded over the entire region of the preliminary chamber 21, the oxygen concentration adjustment chamber 18, and the measurement chamber 20, and a predetermined location of the sensor element 12 can be heated and maintained at a predetermined temperature. Moreover, a heater insulating layer 74 made of alumina or the like is formed above and below the heater 72, for the purpose of obtaining electrical insulation thereof from the second substrate layer 22b and the third substrate layer 22c. Hereinafter, the heater 72, the heater electrode, and the heater insulating layer 74 may also be referred to collectively as a heater portion.

The heating temperature of the sensor element 12 by the heater unit can be, for example, 500 to 900° C. From the standpoint of enhancing the measurement accuracy of $NH_3$ by the mixed potential electrode 82, it is preferable to select the temperature of the sensor element 12 to be as low as possible from within the aforementioned temperature range. On the other hand, if the temperature of the sensor element 12 is too low, the decomposition reaction of NO inside the measurement chamber 20 and outputting itself of the measurement pump current Ip3 of the measurement electrode 62 are reduced. Accordingly, the heating temperature of the sensor element 12 is preferably made as low as possible within the range in which the sensor output of the measurement pump current Ip3 is capable of being detected. As can be appreciated from the above, when the temperature of the sensor element 12 is set within the range of 700 to 800° C., a large sensor output can be obtained and the sensor element 12 operates in a suitable manner.

Furthermore, as shown schematically in FIG. 2, the gas sensor 10 includes an oxygen concentration control unit 100 (main oxygen concentration control unit) that controls the oxygen concentration inside the oxygen concentration adjustment chamber 18, a temperature control unit 102 that controls the temperature of the sensor element 12, the NO concentration measurement unit 104, a preliminary oxygen concentration control unit 106, an $NH_3$ concentration measurement unit 108, and a target component acquisition unit 110.

Moreover, the oxygen concentration control unit 100, the temperature control unit 102, the NO concentration measurement unit 104, the preliminary oxygen concentration control unit 106, the $NH_3$ concentration measurement unit 108, and the target component acquisition unit 110 are constituted by one or more electronic circuits having, for example, one or a plurality of CPUs (central processing units), memory devices, and the like. The electronic circuits are software-based functional units in which predetermined functions are realized, for example, by the CPUs executing programs stored in a storage device. Of course, the electronic circuits may be constituted by an integrated circuit such as an FPGA (Field-Programmable Gate Array), in which the plurality of electronic circuits are connected according to the functions thereof.

As described above, by being equipped with the preliminary chamber 21, the preliminary oxygen concentration control unit 106, the $NH_3$ concentration measurement unit 108, and the target component acquisition unit 110, in addition to the aforementioned oxygen concentration adjustment chamber 18, the oxygen concentration control unit 100, the temperature control unit 102, and the NO concentration measurement unit 104, the gas sensor 10 is made capable of acquiring the concentrations of NO and $NH_3$.

On the basis of the preset oxygen concentration condition, and the first electromotive force V1 generated in the first oxygen partial pressure detecting sensor cell 50 (see FIG. 1), the oxygen concentration control unit 100 feedback-controls the first variable power source 46, and adjusts the oxygen concentration inside the oxygen concentration adjustment chamber 18 to a concentration in accordance with the above-described condition.

The temperature control unit 102 feedback-controls the heater 72 on the basis of a preset sensor temperature condition, and the measured value from a temperature sensor (not shown) that measures the temperature of the sensor element 12, whereby the temperature of the sensor element 12 is adjusted to a temperature in accordance with the aforementioned condition.

By the oxygen concentration control unit 100 or the temperature control unit 102, or alternatively, by the oxygen concentration control unit 100 and the temperature control unit 102, the gas sensor 10 controls the state inside the oxygen concentration adjustment chamber 18, so as to convert all of the $NH_3$ into NO, without causing decomposition of NO inside the oxygen concentration adjustment chamber 18. Further, the $NO_2$ within the gas to be measured is reduced to NO inside the oxygen concentration adjustment chamber 18.

The NO concentration measurement unit 104 measures the measurement pump current Ip3 of the measurement electrode 62 as a first sensor output.

The preliminary oxygen concentration control unit 106 feedback-controls a preliminary variable power source 86 as necessary, so that the first pump current Ip1 of the main pump cell 40 becomes the preset value, thereby adjusting the oxygen concentration inside the preliminary chamber 21 to a concentration in accordance with the condition. Moreover, in the first embodiment, such a measurement is performed without operating the preliminary oxygen concentration control unit 106.

The $NH_3$ concentration measurement unit 108 measures the mixed potential of the mixed potential electrode 82 as a second sensor output.

In addition, the target component acquisition unit 110 acquires the concentrations of NO and $NH_3$ within the gas to be measured, on the basis of the first sensor output of the NO concentration measurement unit 104 and the second sensor output of the $NH_3$ concentration measurement unit 108.

The mixed potential of the mixed potential electrode 82 of the present embodiment is primarily generated by a reaction between oxygen and $NH_3$ within the gas to be measured. Therefore, the mixed potential fluctuates not only due to the concentration of $NH_3$, but also due to the concentration of oxygen. Thus, the target component acquisition unit 110 obtains the oxygen concentration in the gas to be measured on the basis of the first pump current Ip1 of the main pump cell 40. In addition, the target component acquisition unit 110 refers to a map 112, which was obtained by way of previously performed measurements, and in which data is contained related to the oxygen concentration dependency of the mixed potential. In the map 112, data is contained in relation to a correlation between the mixed potential and the $NH_3$ concentration, and the oxygen concentration dependency of such a correlation. On the basis of the second sensor output and the oxygen concentration within the gas to be measured, and by referring to the map 112, the target component acquisition unit 110 corrects any errors due to the oxygen concentration, and thereby determines the $NH_3$ concentration in the gas to be measured.

Further, the target component acquisition unit 110 measures the NO concentration inside the measurement chamber 20 from the first sensor output of the NO concentration measurement unit 104. Then, the concentration of NO in the gas to be measured is determined by subtracting the concentration of $NH_3$ in the gas to be measured, which is determined by referring to the map 112, from the concentration of NO inside the measurement chamber 20.

Next, a description will be given with reference to FIG. 3 concerning chemical reactions of the gas to be measured that take place inside the gas sensor 10.

Figure 3:
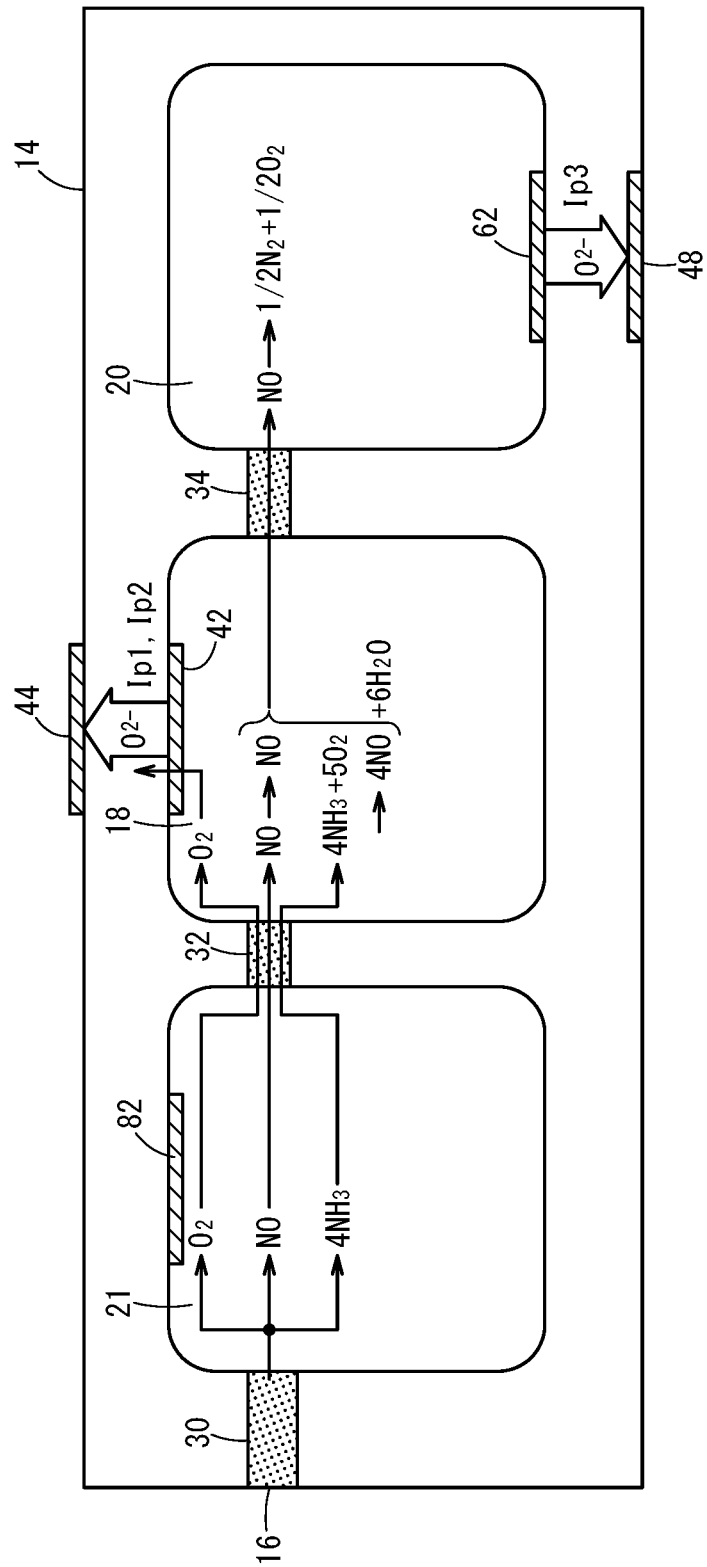
FIG. 3 is an explanatory diagram schematically showing reactions that take place in a gas sensor according to a first embodiment.

As shown in FIG. 3, small part of the gas to be measured, which is introduced into the preliminary chamber 21 through the gas introduction port 16, reacts on the surface of the mixed potential electrode 82, thereby causing the mixed potential V0 to be generated at the mixed potential electrode 82. Since the amount of gas components contributing to the generation of the mixed potential V0 is small, the concentrations of NO, $NH_3$, and oxygen in the gas to be measured undergo almost no change in the preliminary chamber 21.

The oxygen within the gas to be measured, which has flowed from the preliminary chamber 21 into the oxygen concentration adjustment chamber 18, is pumped out by the main pump cell 40, and is set to a predetermined oxygen partial pressure. Further, the $NH_3$ within the gas to be measured causes a reaction to occur in which oxidation from $NH_3$ into NO takes place inside the oxygen concentration adjustment chamber 18, and all of the $NH_3$ inside the oxygen concentration adjustment chamber 18 is converted into NO. Further, nitrogen oxides such as $NO_2$ and the like are converted into NO.

Thereafter, the NO within the oxygen concentration adjustment chamber 18 flows into the measurement chamber 20, and the NO concentration thereof is detected as the measurement pump current Ip3 flowing through the measurement pump cell 61.

Figure 4:
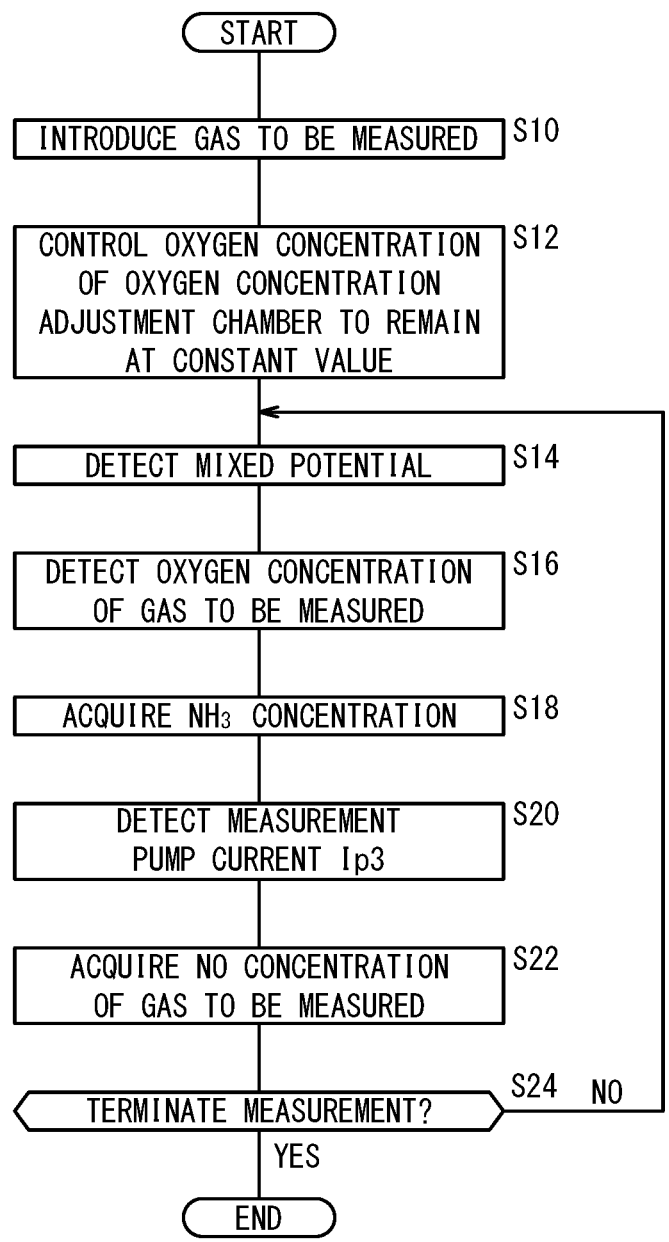
FIG. 4 is a flowchart showing a gas concentration measurement method according to the first embodiment.

Next, a description will be given with reference to the flowchart of FIG. 4 concerning a method of measuring the NO and the $NH_3$ concentrations within the gas to be measured in the gas sensor 10.

First, in step S10, the gas sensor 10 introduces a gas to be measured in which $O_2$, NO and $NH_3$ are mixed into the preliminary chamber 21 through the gas introduction port 16.

Next, in step S12, the oxygen concentration control unit 100 controls the oxygen concentration in the oxygen concentration adjustment chamber 18 to remain at a predetermined constant value. As described above, inside the oxygen concentration adjustment chamber 18, all of the NOx and the $NH_3$ are converted into NO, and an operation is performed to pump out excess oxygen that interferes with measurement of the NO concentration. At this time, the oxygen concentration control unit 100 detects the first electromotive force V1, which is the sensor output of the first oxygen partial pressure detecting sensor cell 50. In addition, the oxygen concentration control unit 100 feedback-controls the value of the first pump current Ip1 to the main pump electrode 42 of the main pump cell 40, in a manner so that the first electromotive force V1 becomes a constant value. Thereafter, control of the first pump current Ip1 is continued by the oxygen concentration control unit 100 while measurement by the gas sensor 10 is carried out.

In step S14, the $NH_3$ concentration measurement unit 108 detects the mixed potential V0, which is a potential difference between the mixed potential electrode 82 and the reference electrode 48. The measurement result (second sensor output) of the mixed potential V0 is input to the target component acquisition unit 110.

In step S16, the target component acquisition unit 110 acquires the first pump current Ip1 of the oxygen concentration control unit 100, and measures the oxygen concentration within the gas to be measured. The target component acquisition unit 110 measures the oxygen concentration within the gas to be measured by referring to the map 112 that represents the correlation between the first pump current Ip1 and the oxygen concentration within the gas to be measured.

In step S18, the target component acquisition unit 110 acquires the $NH_3$ concentration within the gas to be measured. The target component acquisition unit 110 measures the $NH_3$ concentration within the gas to be measured by referring to the map 112 storing therein a correlation between the mixed potential and the $NH_3$ concentration, and data representing the oxygen concentration dependency of such a correlation, which are obtained experimentally in advance. Consequently, any error in the mixed potential due to the oxygen concentration is corrected.

In step S20, the NO concentration measurement unit 104 detects the value (first sensor output) of the measurement pump current Ip3 of the measurement pump cell 61.

In step S22, the target component acquisition unit 110 acquires the NO concentration within the gas to be measured. In this instance, the map 112 includes data representing the correlation, which is obtained experimentally in advance, between the measurement pump current Ip3 and the NO concentration. On the basis of the value of the measurement pump current Ip3 of the measurement pump cell 61 acquired in step S20, the target component acquisition unit 110 refers to the map 112, and acquires the NO concentration within the atmosphere inside the measurement chamber 20. Next, the target component acquisition unit 110 acquires the NO concentration within the gas to be measured, by subtracting the NO concentration derived from the $NH_3$ concentration determined in step S18, from the NO concentration within the atmosphere inside the measurement chamber 20.

In accordance with the above procedure, the concentrations of NO and $NH_3$ within the gas to be measured are determined. Thereafter, in step S24, a determination is made as to whether or not the target component acquisition unit 110 should continue to perform the measurement. If it is determined in step S24 that the target component acquisition unit 110 should continue to perform the measurement, the process proceeds to step S14, and measurement of the concentrations of NO and $NH_3$ is continued. On the other hand, if it is determined in step S24 that the target component acquisition unit 110 is to terminate the measurement, the measurement process carried out by the gas sensor 10 is brought to an end.

Experimental Example

A description will be given of an experimental example in which, in the gas sensor 10 of the present embodiment, a gas to be measured containing NO and $NH_3$ is introduced, and the mixed potential of the mixed potential electrode 82 is measured. In the experimental example, the mixed potential electrode 82 of the gas sensor 10 was manufactured using a paste composed of an Au—Pt alloy containing 5 wt % of Au as a preparatory composition. The mixed potential electrode 82 is formed by applying the Au—Pt alloy paste inside the preliminary chamber 21 when the structural body 14 is stacked or laminated to thereby form the preliminary chamber 21. Thereafter, the mixed potential electrode 82 was formed by being subjected to firing together with the structural body 14 at a temperature on the order of 1400° C.

Moreover, when the gas sensor 10 according to the experimental example was cut, and the atomic percentage of the noble metal particle surface of the mixed potential electrode 82 was measured by an X-ray photoelectron spectroscopy (XPS) method, the atomic percentage of Au was determined to be 60 at %.

Concerning the gas sensor 10 according to the experimental example, in a state in which the temperature thereof is maintained at 750° C. using the heater 72, the gas to be measured was introduced, and the mixed potential V0 was measured. As for the gas to be measured, the oxygen concentration is 10%, the $H_2O$ concentration is 3%, the NO concentration is 0 to 500 ppm, the $NH_3$ concentration is 0 to 500 ppm, and the flow rate thereof is 200 liters/min.

Figure 5:
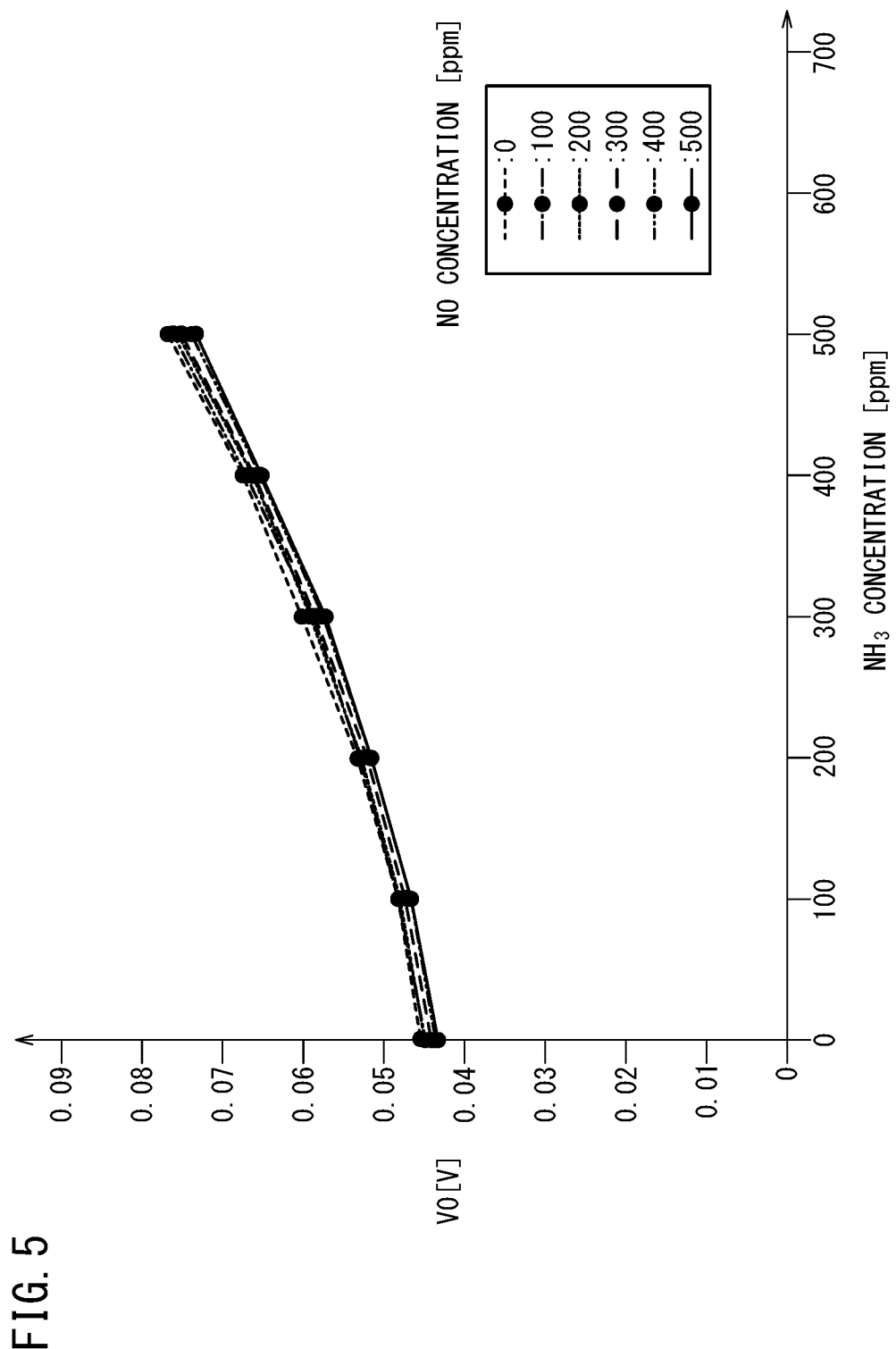
FIG. 5 is a graph showing measurement results of a mixed potential with respect to an $NH_3$ concentration of a gas to be measured in the gas sensor of FIG. 1.

As shown in FIG. 5, at the mixed potential electrode 82 of the present experimental example, the mixed potential V0 rises accompanying an increase in the $NH_3$ concentration. On the other hand, it is understood that, even if the concentration of NO is changed within a range of 0 to 500 ppm, the mixed potential V0 undergoes almost no change, but only changes in respect to the $NH_3$ concentration.

Accordingly, it was confirmed that, by detecting the mixed potential of the mixed potential electrode 82 inside the preliminary chamber 21, from among the concentrations of NO and $NH_3$, it was possible to selectively measure only the concentration of $NH_3$.

The gas sensor 10 described above exhibits the following advantageous effects.

In the gas sensor 10, by providing the mixed potential electrode 82 in the preliminary chamber 21, based on the mixed potential (second sensor output) of the mixed potential electrode 82, it is possible to selectively detect the $NH_3$ concentration in relation to the gas to be measured which contains NO and $NH_3$. Further, by subtracting the $NH_3$ concentration from the NO concentration that was detected based on the measurement pump current Ip3 (first sensor output), the NO concentration within the gas to be measured can be measured.

Further, according to the gas sensor 10, since it is unnecessary to perform measurements while switching is carried out at regular intervals between driving and stopping of the preliminary pump cell 80 inside the preliminary chamber 21, the concentrations of NO and $NH_3$ within the gas to be measured can be constantly measured. Therefore, the response speed of the sensor output with respect to changes in the gas concentrations is excellent. Furthermore, in the oxygen concentration adjustment chamber 18 and the measurement chamber 20, since the gas sensor 10 draws in the gas to be measured, the gas to be measured can be quickly introduced into the preliminary chamber 21 and the measurement chamber 20. Therefore, according to the gas sensor 10, responsiveness is even further superior than in a conventional mixed potential gas sensor.

Further, although the mixed potential electrode 82 is capable of measuring $NH_3$ even if it is arranged on the surface of the sensor element 12 (for example, adjacent to the exterior side pump electrode 44), by forming the mixed potential electrode 82 in the interior of the preliminary chamber 21 as in the present invention, any chance of being exposed to impurities contained in the exhaust gas (for example, sulfur, phosphorus, silicon, etc.) is reduced, and the durability of the mixed potential electrode 82 is enhanced.

In the gas sensor 10, the mixed potential electrode 82 may be made from any one of a gold (Au)-platinum (Pt) alloy, bismuth vanadium oxide ($BiVO_4$), copper vanadium oxide ($Cu_2(VO_3)_2$), tungsten oxide, and molybdenum oxide. Further, in the case that the mixed potential electrode 82 is made of an Au—Pt alloy, a large mixed potential output can be obtained by providing the Au at a concentration of 30 at % or greater. Further, by using the above-described mixed potential electrode 82, the concentration of $NH_3$ can be selectively measured from within the gas to be measured.

In the gas sensor 10, the target component acquisition unit 110 is capable of acquiring the NO concentration within the gas to be measured, by subtracting a contribution due to the $NH_3$ concentration from the NO concentration obtained from the measurement pump current Ip3 of the measurement electrode 62.

In the gas sensor 10, the target component acquisition unit 110 acquires the $NH_3$ concentration by measuring the oxygen concentration within the gas to be measured from the first pump current Ip1 of the main pump electrode 42, together with correcting the correlation between the mixed potential and the $NH_3$ concentration on the basis of the measurement result of the oxygen concentration. In accordance with this feature, the influence of errors in the mixed potential due to fluctuations of the oxygen concentration can be eliminated, and an accurate $NH_3$ concentration can be determined.

Second Embodiment

Hereinafter, a description will be given of a gas concentration measurement method according to a second embodiment of the present invention. The gas sensor 10 used for measuring the gas concentration according to the present embodiment is the same as the gas sensor 10 shown in FIG. 1.

According to the present embodiment, in order to prevent fluctuations in the mixed potential due to the oxygen concentration, in the gas sensor 10 shown in FIG. 1, the preliminary pump voltage Vp0 is applied between the mixed potential electrode 82 and the exterior side pump electrode 44, thereby controlling the oxygen concentration in the preliminary chamber 21 to remain at a constant value.

Figure 6:
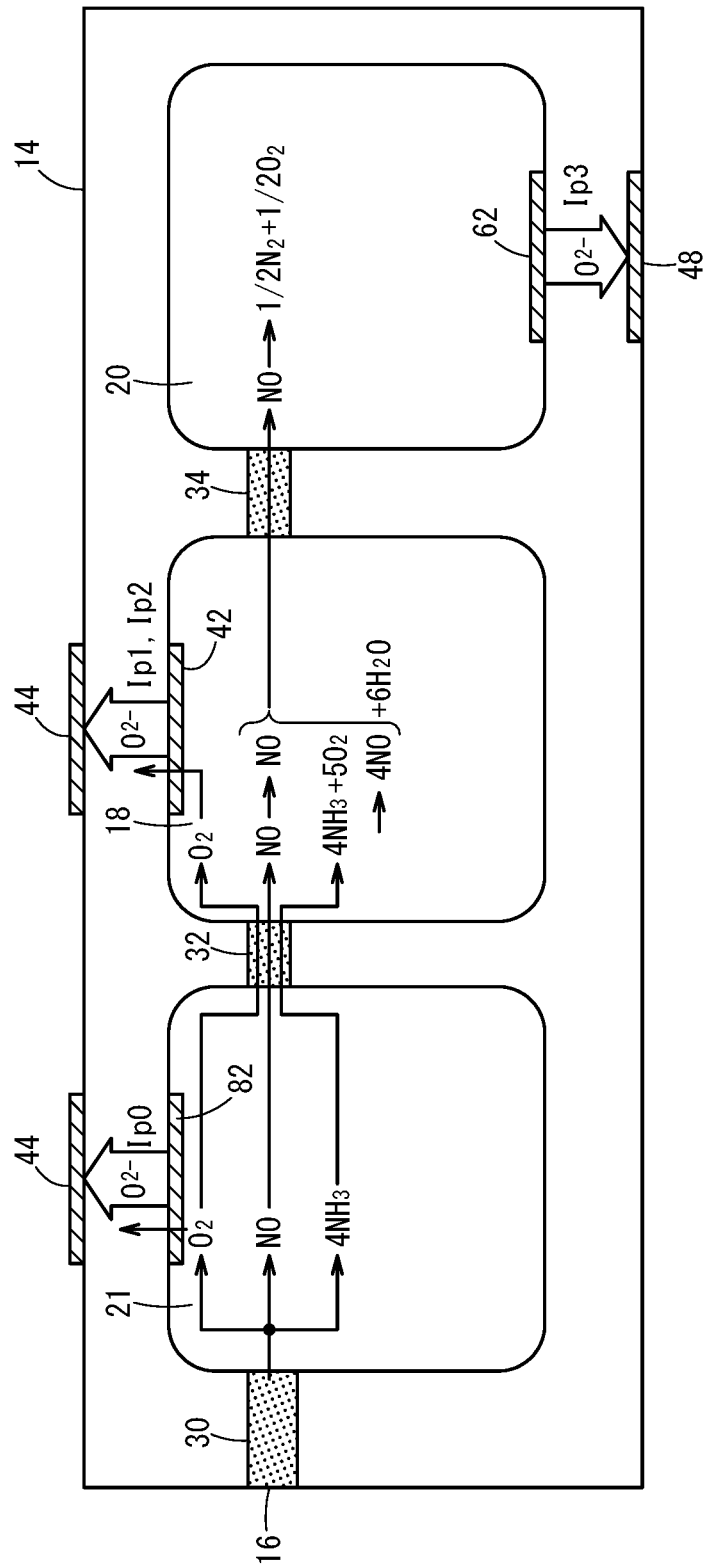
FIG. 6 is an explanatory diagram schematically showing reactions that take place in a gas sensor according to a second embodiment.

More specifically, the preliminary oxygen concentration control unit 106 of FIG. 2 is operated. In the present embodiment, the preliminary oxygen concentration control unit 106 acquires the first pump current Ip1 of the main pump cell 40, and feedback-controls the preliminary pump voltage Vp0 of the mixed potential electrode 82 in a manner so that the first pump current Ip1 becomes a constant value. Consequently, as shown in FIG. 6, excess $O_2$ inside the preliminary chamber 21 is pumped out by the preliminary pump cell 80 that is formed between the mixed potential electrode 82 and the exterior side pump electrode 44. Further, in the case that the oxygen concentration is lower than a predetermined value, oxygen is pumped into the interior of the preliminary chamber 21 by the preliminary pump cell 80. Consequently, even if fluctuations occur in the oxygen concentration within the gas to be measured, the oxygen partial pressure inside the preliminary chamber 21 is maintained at a constant value. In this manner, measurement of the mixed potential is carried out under the oxygen concentration control performed by the preliminary oxygen concentration control unit 106.

The configuration and operation of the oxygen concentration adjustment chamber 18 and the measurement chamber 20 are the same as the measurement operation of the NO concentration performed by the gas sensor 10 of the first embodiment.

Hereinafter, operations of measuring the gas concentration in the present embodiment will be described with reference to the flowchart of FIG. 7.

First, in step S30, the gas sensor 10 introduces a gas to be measured in which $O_2$, NO and $NH_3$ are mixed into the preliminary chamber 21, through the gas introduction port 16.

Next, in step S32, the oxygen concentration control unit 100 controls the oxygen concentration in the oxygen concentration adjustment chamber 18 to remain at a predetermined constant value. As described above, inside the oxygen concentration adjustment chamber 18, all of the NOx and the $NH_3$ are converted into NO, and an operation is performed to pump out excess oxygen that interferes with measurement of the NO concentration. At this time, the oxygen concentration control unit 100 detects the first electromotive force V1, which is the sensor output of the first oxygen partial pressure detecting sensor cell 50. In addition, the oxygen concentration control unit 100 feedback-controls the value of the first pump current Ip1 to the main pump electrode 42 of the main pump cell 40, in a manner so that the first electromotive force V1 becomes a constant value. Thereafter, control of the first pump current Ip1 is continued by the oxygen concentration control unit 100 while measurement by the gas sensor 10 is carried out.

In step S34, the preliminary oxygen concentration control unit 106 feedback-controls the oxygen concentration inside the preliminary chamber 21 to remain at a constant value. More specifically, in accordance with the magnitude of the first pump current Ip1 of the oxygen concentration control unit 100, the preliminary oxygen concentration control unit 106 applies the preliminary pump voltage Vp0 between the mixed potential electrode 82 and the exterior side pump electrode 44. Thereafter, control of the preliminary pump voltage Vp0 is continued by the preliminary oxygen concentration control unit 106 while measurement of the gas concentration is carried out.

Next, in step S36, the $NH_3$ concentration measurement unit 108 detects the mixed potential V0, which is the potential difference between the mixed potential electrode 82 and the reference electrode 48. The measurement result (second sensor output) of the mixed potential V0 is input to the target component acquisition unit 110.

In step S38, the target component acquisition unit 110 refers to the map 112 in relation to the correlation (see FIG. 5), which is obtained experimentally in advance, between the mixed potential and the $NH_3$ concentration, and acquires the $NH_3$ concentration of the gas to be measured from the mixed potential.

In step S40, the NO concentration measurement unit 104 detects the measurement pump current Ip3.

In step S42, the target component acquisition unit 110 acquires the NO concentration of the gas to be measured. In this instance, the map 112 includes data representing the correlation, which is obtained experimentally in advance, between the measurement pump current Ip3 and the NO concentration. On the basis of the value of the measurement pump current Ip3 of the measurement pump cell 61, the target component acquisition unit 110 refers to the map 112, and acquires the NO concentration within the atmosphere inside the measurement chamber 20. Next, the target component acquisition unit 110 acquires the NO concentration within the gas to be measured, by subtracting the NO concentration derived from the $NH_3$ concentration determined in step S38 from the NO concentration within the atmosphere inside the measurement chamber 20. In accordance with the above procedure, the concentrations of NO and $NH_3$ within the gas to be measured are determined.

Thereafter, in step S44, a determination is made as to whether or not the target component acquisition unit 110 should continue to perform the measurement. If it is determined in step S44 that the target component acquisition unit 110 should continue to perform the measurement, the process proceeds to step S36, and measurement of the concentrations of NO and $NH_3$ is continued. On the other hand, if it is determined in step S44 that the target component acquisition unit 110 is to terminate the measurement, the measurement process is brought to an end.

In this operation mode of the present embodiment, the gas sensor 10 exhibits the following effects.

In the gas sensor 10 according to this operation mode of the present embodiment, the target component acquisition unit 110 acquires the $NH_3$ concentration on the basis of the mixed potential of the mixed potential electrode 82, under a condition in which the oxygen concentration inside the preliminary chamber 21 is maintained at a constant value by the preliminary oxygen concentration control unit 106. Accordingly, there is no need to correct the mixed potential based on the first pump current Ip1 of the main pump cell 40, and processing of the measurement data is simplified.

Although the present invention has been described above by way of preferred embodiments, the present invention is not limited to the above-described embodiments, and it goes without saying that various modifications can be made within a range that does not depart from the essence and gist of the present invention.

What is claimed is:

1. A gas sensor configured to measure concentrations of a plurality of components in a presence of oxygen, comprising:
    a structural body made up from a solid electrolyte that exhibits at least oxygen ion conductivity;
    a gas introduction port formed in the structural body and into which a gas to be measured is introduced;
    a preliminary chamber including a mixed potential electrode and communicating with the gas introduction port;
    an oxygen concentration adjustment chamber including a main pump electrode and communicating with the preliminary chamber;
    a measurement chamber including a measurement electrode and communicating with the oxygen concentration adjustment chamber;
    a reference electrode formed on a surface of the structural body and placed in contact with a reference gas;
    a main pump cell including the main pump electrode, the main pump cell pumping out or pumping in oxygen to control an oxygen concentration inside the oxygen concentration adjustment chamber based on a voltage of the main pump electrode;
    a mixed potential sensor cell including the mixed potential electrode, the mixed potential cell detecting a mixed potential between the reference electrode and the mixed potential electrode; and
    a measurement pump cell including the measurement electrode, the measurement pump cell measuring a NO concentration inside the measurement chamber based on a pump current of the measurement electrode,
    wherein at least a surface of the mixed potential electrode is made of a gold (Au)/platinum (Pt) alloy containing gold at a concentration of greater than or equal to 30 at %.

2. The gas sensor according to claim 1, further comprising a processor coupled to a memory storing instructions that when executed by the processor configure the processor to:
    acquire an $NH_3$ concentration and the NO concentration within the gas to be measure, and
    acquire the NO concentration by subtracting a NO concentration derived from the $NH_3$ concentration, from the NO concentration obtained from the pump current of the measurement electrode,
    wherein the $NH_3$ concentration within the gas to be measured is acquired based on the detected mixed potential, while the pump current is supplied to the measurement electrode and the oxygen within the gas to be measured is being discharged.

3. The gas sensor according to claim 1, further comprising a processor coupled to a memory storing instructions that when executed by the processor configure the processor to:
    acquire an $NH_3$ concentration and the NO concentration within the gas to be measured, and
    acquire the $NH_3$ concentration by measuring the oxygen concentration within the gas to be measured from a pump current of the main pump electrode, together with correcting a correlation between the mixed potential and the $NH_3$ concentration based on the oxygen concentration within the gas to be measured,
    wherein the $NH_3$ concentration within the gas to be measured is acquired based on the detected mixed potential, while the pump current is supplied to the measurement electrode and the oxygen within the gas to be measured is being discharged.

4. The gas sensor according to claim 1, further comprising a preliminary pump cell including a preliminary pump electrode and configured to control an oxygen partial pressure of the preliminary chamber by supplying a pump current to the mixed potential electrode, wherein under a condition in which the oxygen partial pressure in the preliminary chamber is maintained at a constant value by the preliminary pump cell, and
    a processor coupled to a memory storing instructions that when executed by the processor configure the processor to:
    acquire an $NH_3$ concentration and the NO concentration within the gas to be measured, and
    acquire the $NH_3$ concentration within the gas to be measured based on the mixed potential,
    wherein the $NH_3$ concentration within the gas to be measured is acquired based on the detected mixed potential, while the pump current is supplied to the measurement electrode and the oxygen within the gas to be measured is being discharged.

5. A gas concentration measurement method by which concentrations of a plurality of components within a gas to be measured are measured in a presence of oxygen, using a gas sensor equipped with a structural body made up from a solid electrolyte that exhibits at least oxygen ion conductivity, a gas introduction port formed in the structural body and into which the gas to be measured is introduced, a preliminary chamber including a mixed potential electrode and communicating with the gas introduction port, an oxygen concentration adjustment chamber including a main pump electrode and communicating with the preliminary chamber, a measurement chamber including a measurement electrode and communicating with the oxygen concentration adjustment chamber, and a reference electrode formed on a surface of the structural body and placed in contact with a reference gas, the method comprising the steps of:
    detecting a mixed potential of the mixed potential electrode; and
    acquiring an $NH_3$ concentration within the gas to be measured based on the detected mixed potential, while a pump current is supplied to the measurement electrode and the oxygen within the gas to be measured is being discharged.

6. The gas concentration measurement method according to claim 5, further comprising the steps of:
converting $NH_3$ into NO in the oxygen concentration adjustment chamber by supplying a predetermined pump current to the main pump electrode in the oxygen concentration adjustment chamber;
decomposing NO by supplying a pump current to the measurement electrode in the measurement chamber to thereby discharge the oxygen; and
measuring a NO concentration based on the pump current of the measurement electrode.

7. The gas concentration measurement method according to claim 6, further comprising the step of:
acquiring the NO concentration within the gas to be measured, by subtracting the $NH_3$ concentration obtained from the mixed potential, from the NO concentration inside the measurement chamber.

8. The gas concentration measurement method according to claim 5, further comprising the steps of:
measuring the mixed potential without supplying a pump current to the mixed potential electrode;
determining an oxygen partial pressure in the gas to be measured from a value of the pump current supplied to the main pump electrode; and
acquiring the $NH_3$ concentration by correcting an oxygen concentration dependency of the mixed potential based on the oxygen partial pressure within the gas to be measured.

9. The gas concentration measurement method according to claim 5, wherein the $NH_3$ concentration within the gas to be measured is acquired by measuring the mixed potential of the mixed potential electrode, while an oxygen partial pressure inside the preliminary chamber is maintained at a constant value by supplying a pump current to the mixed potential electrode.

10. The gas concentration measurement method according to claim 5, wherein a gold (Au)/platinum (Pt) alloy containing gold at a concentration of greater than or equal to 30 at % is used in at least a surface on the mixed potential electrode.

* * * * *